Nov. 12, 1940.  J. D. HOSMER  2,221,381

FISH LURE

Filed May 22, 1939

INVENTOR.
John D. Hosmer
BY
ATTORNEY.

Patented Nov. 12, 1940

2,221,381

UNITED STATES PATENT OFFICE 2,221,381

FISH LURE

John D. Hosmer, Dearborn, Mich.

Application May 22, 1939, Serial No. 274,895

7 Claims. (Cl. 43—42)

This invention relates to fish lures and has for its primary object to provide a lure resembling an amphibious animal such as a frog and embodying means for moving the rear leg resembling portions in simulation of the swimming movement of a frog.

More specifically, the main object is to provide a fish lure having articulated leg resembling members, yielding means normally holding the leg resembling portions in one position, and means operable by manipulation of the line for articulately moving the leg portions in simulation of swimming movements. In this respect, a slidable rod is mounted in the lure body and is connected at one end to the outer extremities or "ankles" of the leg resembling portions. A spring acts upon the rod and causes it to extend the leg resembling portions and a line is connected to the other end of the slidable rod. When the line is intermittently pulled or tugged it reciprocates the rod to bend the legs, and when the line is released the spring returns the rod and the legs to their normal or extended position.

Another object is to provide a lure of this type having hooks on the extreme end or "ankle" portion of the leg resembling portions. Due to connection of the rod above mentioned to the ankle portions and direct attachment of the line to the rod, a direct connection exists between the "ankle" portion and the line. As a result of this direct connection the leg portion articulating means has no other function than to provide for relative articulation, and is not subject to damage by the pull exerted by a fish on the hooks.

Another object is to provide a lure of this type embodying flexible foot resembling portions attached to the "ankle" portion in such manner as to conceal or partially conceal the hooks thereon.

Another object is to provide a buoyant lure of this type, formed of wood or other suitable material to enable it to float, and embodying a metal plate which adds to the weight thereof to provide sufficient inertia to permit the spring to quickly extend the legs after tension has been released on the line, and to permit contraction of the springs in collapsing the legs.

Another object is to provide a lure of this type embodying a metal bracket supporting the rod for sliding movement and a spring acting thereon for yieldingly moving the rod in one direction, said bracket also constituting a support for the articulated leg resembling members.

Another object is to provide a lure of this type having hooks on the body portion in resemblance of the fore legs of a frog.

Figure 1:
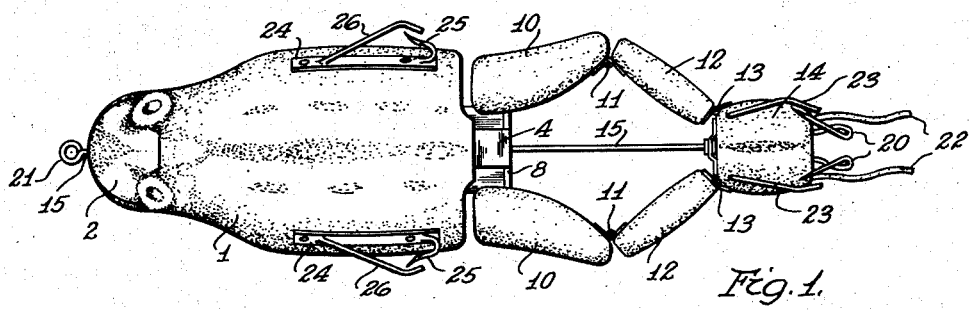
Figure 2:
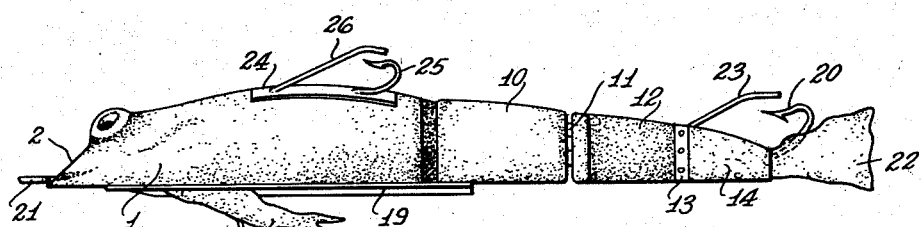
Figure 3:
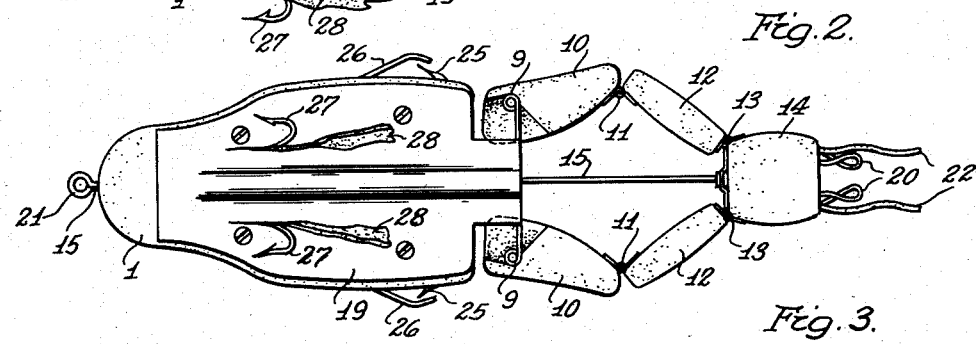
Figure 4:
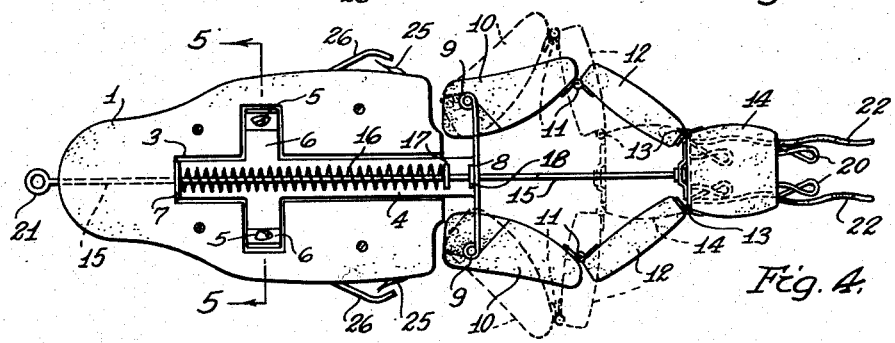
Figure 5:
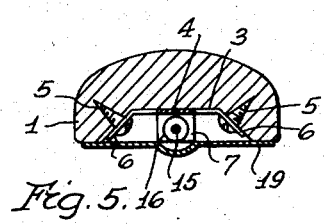

Other objects and advantages will become more fully apparent as reference is had to the accompanying drawing wherein my invention is illustrated, and in which:

Fig. 1 is a top plan of the lure,
Fig. 2 is a side elevation,
Fig. 3 is a bottom view,
Fig. 4 is a bottom view with the metal cover plate removed, and
Fig. 5 is a section taken on the line 5—5 of Fig. 4.

More particularly, I designates a main body portion shaped to resemble the body of a frog and having a forward end portion 2 inclined to act as a cavitation surface when the body is drawn through water. In the bottom of the body is a recess 3 in which a bracket 4 is secured by attaching screws 5 engaging lateral extensions 6 thereon. The bracket 4 has two upstanding portions 7 and 8, the latter of which is extended laterally and bent to provide pintle receiving loops 9.

Leg resembling portions 10 are pivotally connected to the loops 9, and at their swinging ends are connected by hinges 11 to leg resembling portions 12. The two leg resembling portions 12 are connected by hinges 13 to a common "ankle" portion 14.

A rod 15 is slidably mounted in the two upstanding portions 7 and 8 of the bracket and has its rear end connected to the ankle portion. A spring 16, sleeved on the rod 15, acts between the upstanding portion 7 and a collar 17 on the rod to yieldingly urge the rod rearwardly, and a second collar 18 on the rod engages the upstanding portion 8 to restrict such movement. The forward end of the rod 15 extends slidably through the body 1 and has an eye 21 on its forward extremity for attachment of a line or leader thereto.

When the rod 15 is pulled or tugged, and movement of the body 1 is resisted as is the case when it is in water, the spring 16 compresses to allow sliding movement of the rod relative to the body 1. The leg resembling portions 10 and 12 are thus caused to move articulately to the position shown in dotted lines in Fig. 4. When the pull on the rod is released, the spring again extends the legs.

A cover plate 19 is mounted on the bottom of the body 1 to cover the recess 3, bracket 4 and spring 16. This bracket is formed of metal and adds to the weight of the lure to such an extent that sufficient inertia is present to enable the spring to compress when the rod 15 is pulled.

It is apparent that direct connection of the rod 15 to the ankle portion 14 relieves the hinges 9, 11 and 13 of tension in the presence of a pull on the ankle portion 14. The ankle portion 14 has hooks 20 thereon, and due to direct connection of the rod to the ankle portion, the hooks are in direct connection with a line or leader attached to the eye 21 on the forward end of the rod. Flexible foot resembling portions 22 are mounted on the ankle portion 14 to at least partially conceal the hooks 20, and flexible weed guards 23 are mounted on the ankle portion to protect the hooks.

On the upper or back of the body portion 1 are brackets 24 each having a hook 25 and a weed guard 26 thereon. Beneath the body 1 are hooks 27 located in the region of the front legs and covered with flexible leg resembling portions 28. Either or any of these front hooks may be omitted if desired.

What is claimed is:

1. In a lure, a body portion resembling the body of an animal, articulated members hingedly connected to the body and connected together at their outer extremities by an ankle resembling portion, a rod slidably mounted in the body and directly connected to said ankle resembling portion, a spring acting on said rod and urging movement thereof in a direction to extend the leg resembling members, and means for connecting a line to the other end of said rod.

2. In a lure, a body having a recess therein, a bracket mounted in said recess and extending rearwardly thereof, leg resembling elements articulately mounted on the extending portion of the bracket, a rod slidably mounted in said bracket and connected to said elements for articulating the same, and a spring acting on said rod to normally hold said elements extended.

3. In a lure, a body having a recess therein, a bracket secured in said recess, lateral extensions on said bracket, leg resembling elements mounted on said extensions, a rod slidable in said bracket and connected to the leg elements for articulating the same, and a spring acting on said rod to normally hold the leg elements extended.

4. In a lure, a body having a recess therein, a bracket mounted in said body and extending rearwardly thereof, leg resembling elements articulately mounted on the extending portion of the bracket, an ankle resembling portion connecting the outer extremities of the leg elements, a rod slidably mounted in the bracket and connected to said ankle portion, and a spring acting on said rod to normally hold the leg elements extended.

5. In a lure, a body having a recess therein, a bracket secured in said recess, a rod, means on said bracket slidably supporting said rod, one of said means being extended laterally to provide hinge members, articulated leg members hingedly connected to said hinge members, a spring engaging the other of said means and said rod to reciprocate said rod in one direction, and means connecting said rod to said leg elements in such manner that movement of the rod in opposition to the spring causes articulation of the leg elements.

6. In a lure, a body having a recess therein, a bracket secured in said recess, a rod, means on said bracket slidably supporting said rod, one of said means being extended laterally to provide hinge members, articulated leg members hingedly connected to said hinge members, a spring engaging the other of said means and said rod to reciprocate said rod in one direction, and an ankle resembling portion connecting the outer extremities of the leg members and directly connected to said rod.

7. In a lure, a body portion resembling the body of a frog, articulated members attached to said body and resembling the legs of a frog, yielding means normally holding the articulated members extended, a line connecting member connected to the articulated members for moving said members in opposition to the spring, fore leg resembling portions having hooks concealed therein, and brackets mounted on the back portion of said body, each bracket having a hook and a flexible weed guard therefor.

JOHN D. HOSMER.